Jan. 12, 1932.  H. A. DENMIRE  1,840,489
EXPANSIBLE TIRE CORE
Filed March 5, 1928  2 Sheets-Sheet 1
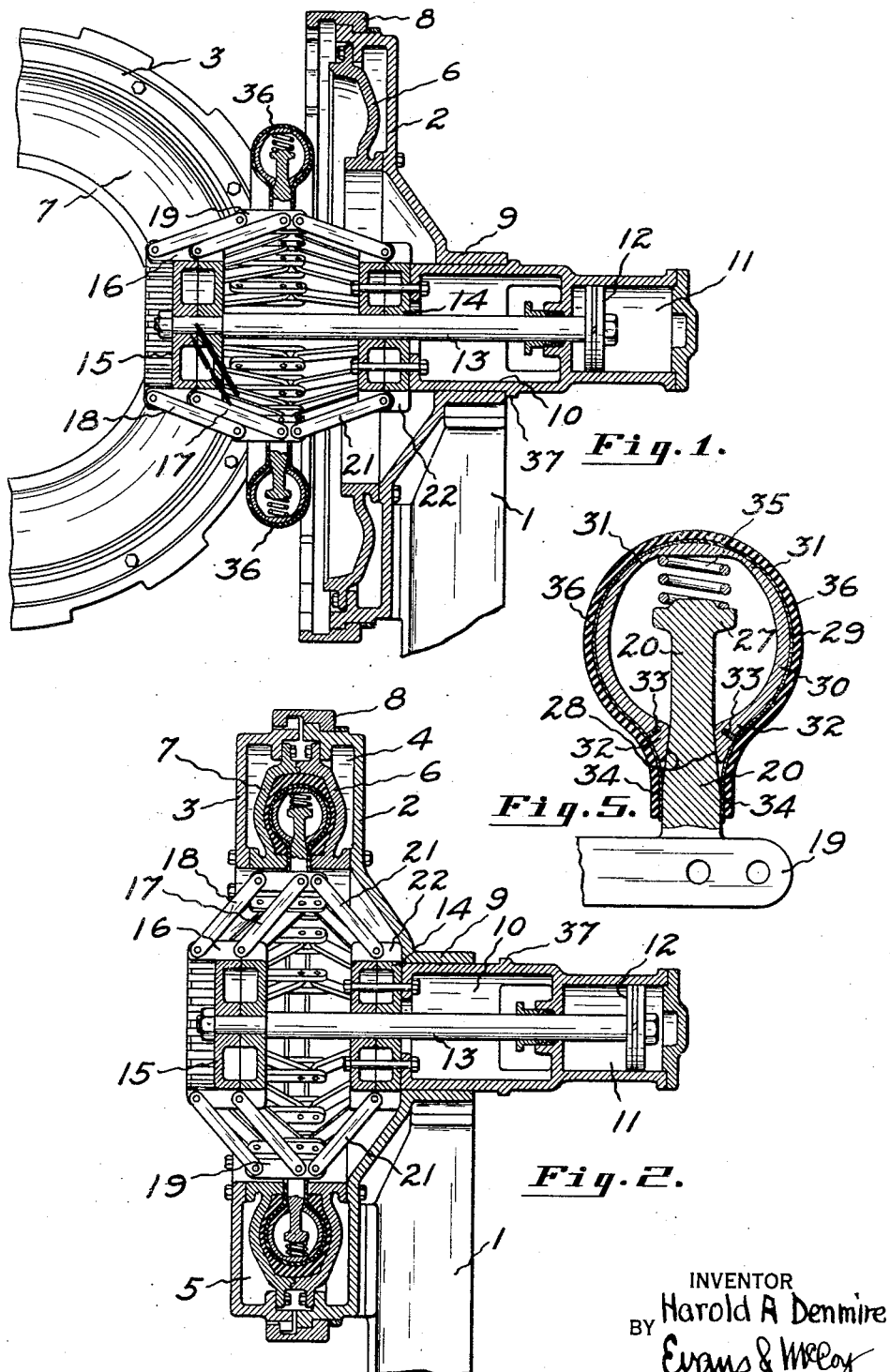
INVENTOR
Harold A Denmire
BY Evans & McCoy
ATTORNEYS Jan. 12, 1932.  H. A. DENMIRE  1,840,489
EXPANSIBLE TIRE CORE
Filed March 5, 1928   2 Sheets-Sheet 2

INVENTOR
Harold A. Denmire
BY Evans & Wiley
ATTORNEYS

Patented Jan. 12, 1932

1,840,489

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

EXPANSIBLE TIRE CORE

Application filed March 5, 1928. Serial No. 259,293.

This invention relates to expansible tire cores and more particularly to an expansible core forming a part of a tire vulcanizing heater.

The present invention has for an object to provide an expansible annular core permanently connected with a tire mold of a vulcanizing heater, which is adapted to be contracted to a diameter such that a tire casing may be placed thereon and then expanded to the diameter of the mold cavity and which is so mounted that after a tire casing has been placed thereon, the core and casing may be clamped in the mold cavity.

A further object is to provide a core which is expansible laterally as well as radially so that internal pressure may be applied to a tire casing in the mold.

A further object is to provide supporting and expanding means for the core which will permit assembly of the tire on the core and the closing of the mold sections with the core and tire in the mold cavity.

A further object of the invention is to provide fluid pressure operated means for expanding the core radially and for applying internal pressure thereto.

A further object is to provide a core made up of telescopically connected arcuate sections which has a smooth exterior surface.

The present invention aims to provide an expansible core of durable construction which is adapted to be expanded by a mechanical means and which is capable of performing the functions of the usual air bag inserted in tire casings before vulcanizing and supplied with air under pressure during the vulcanizing operation.

The rubber air bags deteriorate very rapidly and the continual replacement of air bags materially increases the cost of vulcanizing tires.

The present invention has for an object to materially lessen the cost of vulcanizing tires by providing an expansible core which is permanently associated with the vulcanizing heater and which serves the purpose of the air bags heretofore employed.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Figure 1 is a central vertical section taken through a watch case heater to which the present invention has been applied, showing the tire mold opened and the core contracted.

Fig. 2 is a sectional view similar to Fig. 1, showing the mold closed and the core expanded.

Fig. 5 is a fragmentary section on an enlarged scale showing one of the radial core supporting and expanding members.

Figure 3:
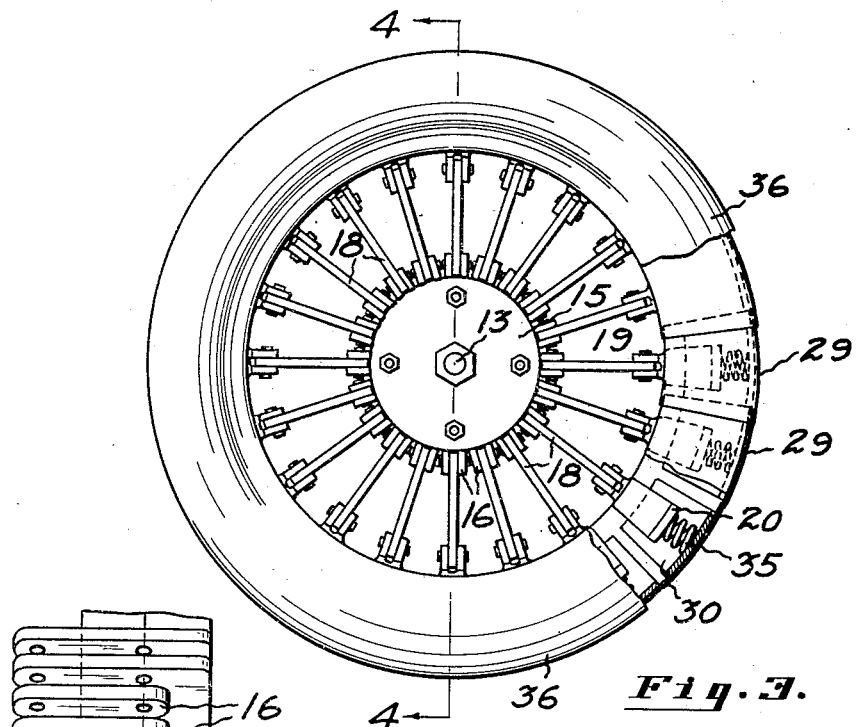
Fig. 3 is a front elevation of the expansible core.
Figure 6:
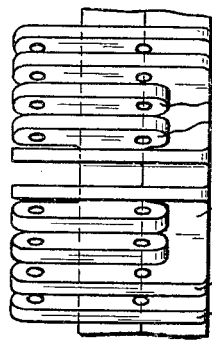
Fig. 6 is a side elevation of the movable head through which the forward core supporting links are connected.
Figure 7:
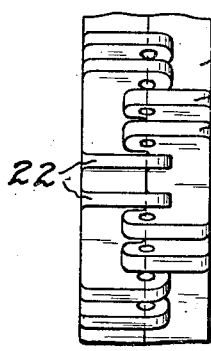
Fig. 7 is a fragmentary side elevation of the fixed head to which the rear core supporting links are connected.

Figs. 1 and 2 of the drawings show the invention applied to a vulcanizing heater of the watch case type which is mounted upon a suitable stationary support 1 and consists of a mold section 2 fixed to the support 1 and a complemental section 3 which is hinged to the fixed section 2. The mold sections 2 and 3 are of annular form and hollow to provide steam chambers 4 and 5 on opposite sides of the annular mold cavity which is formed between complemental annular recesses 6 and 7 formed on inner sides of the sections. The section 3 of the mold can be swung to open position to permit the insertion and removal of tires and the mold sections are locked in closed position by means of the usual locking ring 8.

The watch case heater, as so far described, is old and well known, the present invention consisting of an expansible core and the application thereof to a vulcanizing heater in such manner that it is adapted to receive a tire casing and be positioned with the tire casing thereon within the cavity of the mold. The fixed section 2 of the mold is provided with a hub 9 adapted to receive a cylindrical core supporting member 10, which is mounted to slide longitudinally in the hub 9. The cylindrical supporting member 10 is provided at its rear end with a fluid pressure cylinder 11 with which there is a piston 12 which has connected thereto a piston rod 13 which extends axially through the supporting member 10 and projects through a bearing member 14 which is rigidly secured to the forward end of the supporting member. At its forward end, the piston rod 13 has attached thereto a head 15 which is provided upon its periphery with projecting lugs 16 arranged in pairs, each pair receiving between them parallel links 17 and 18 which are mounted to swing in radial planes. The head 15 is preferably formed in two halves and alternate pairs of lugs 16 are preferably integral with the inner and outer halves of the head to facilitate assembly of the links on the head. The links 17 and 18 of each pair are of the same length and are pivoted at spaced points at their outer ends to an axially extending bar 19 which is maintained by the parallel links parallel with the axis of the mold. The pairs of links are mounted at closely spaced points around the periphery of the head 15 so as to provide a relatively large number of radially movable core expanding units and each of the bars 19 has fixed thereto a radially and outwardly extending arm 20, the arms 20 providing supports for an annular expansible core, as will hereinafter be more fully explained. The inner ends of the bars 19 are pivotally connected to links 21 which are inclined oppositely with respect to the links 17 and 18 and are connected at their lower ends to lugs 22 formed integrally with the head 14. The bearing head 14 is preferably of the same diameter of the head 15 and similarly constructed in two halves with alternate pairs of lugs 22 integral with the inner and outer halves thereof to facilitate assembly.

Figure 4:
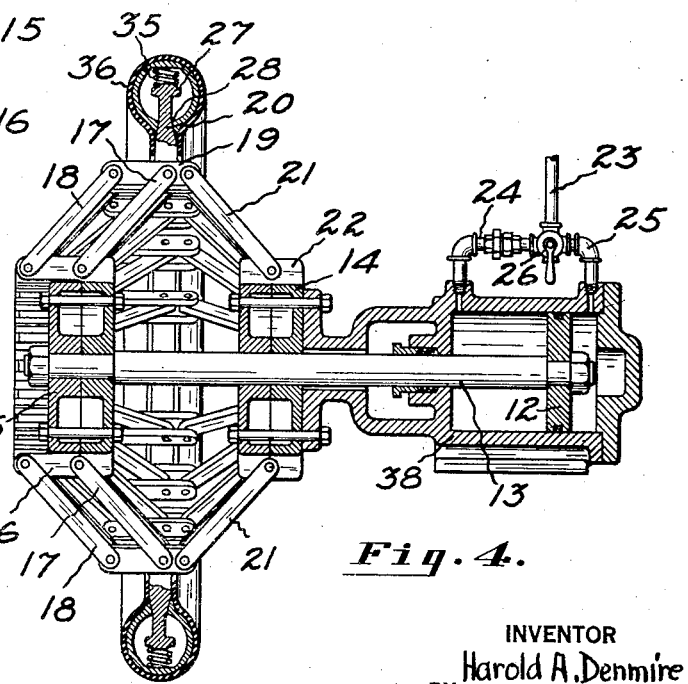
Fig. 4 is a vertical section taken on the line indicated at 4—4 in Fig. 3.

By admitting pressure to the cylinder 11 at the rear of the piston 12, the head 15 is moved outwardly causing the core to be collapsed to the position shown in Fig. 1 and by admitting pressure to the cylinder 11 in front of the piston 12, the head 15 is moved toward the head 14 causing the core supports 20 to be moved outwardly to expand the core. Pressure may be admitted to the cylinder 11 through a pressure pipe 23 which communicates with the front and rear ends of the cylinder through pipes 24 and 25 as shown in Fig. 4 of the drawings. A suitable control valve 26 is provided for controlling the admission and exhaust of fluid under pressure to and from the cylinder. This valve may be an ordinary cylinder control valve provided with an exhaust port and movable to connect either one of the pipes 24 or 25 with the pressure line 23 and the other with the exhaust port. The pressure admitted to either end of the cylinder may be controlled by regulating the movement of the control valve 26 as well understood in the art.

Each of the core supporting arms 20 is provided at its outer end with an enlarged head 27 and, toward the inner ends thereof, these arms have outwardly tapering front and rear faces 28 for a purpose which will presently be explained. The annular core is made up of expansible arcuate sections 29 which are preferably formed of resilient sheet metal, the arcuate sections being telescopically joined end to end to form a continuous annular core body. The sheet metal sections 29 are each formed from a sheet metal plate bent to conform substantially to the interior of a tire casing and having spaced side edges forming an opening at the interior of the core annulus through which the supporting members 20 extend. Each core section is provided with an internal stiffening member 30 which may be in the form of a casting which conforms to the interior of the wall of the sheet metal section and each stiffening member is provided with relatively thin shoulder portions 31 which permit the stiffening members to flex laterally. The stiffening members 30 have thickened end portions 32 which are formed to bear against the inclined faces 28 on opposite sides of the supporting arms 20 and these thickened portions 32 are attached to the sheet metal sections 29 by means of screws 33. The inherent resiliency of the core sections composed of the sheet metal shell 29 and stiffening members 30 cause the bearing portions 32 of the stiffening member to tightly grip the inclined faces 28 of the supporting member. The edge portions 34 of the sheet metal shell 29 of each core section extends past the bearing portions 32 of the stiffening member and bear upon the opposite faces of the supporting arm 20 inwardly of the bearing portions 32 of the stiffening member. Each core section is yieldably supported on an arm 22 by means of a compression coil spring 35 interposed between the enlarged head 27 of the supporting arm and the wall of the core section, each coil spring 35 extending outwardly in a radial direction from the end of the supporting arm.

When fluid under pressure is admitted to the forward end of the cylinder 11, the heads 15 and 14 are drawn one toward the other, causing the supporting arms 20 to be moved outwardly in a radial direction, each arm carrying its core section with it so that the telescopic sections are drawn out to enlarge the diameter of the core, the telescopic connection between the sections permitting the sections to move apart without breaking the continuity of the core.

In order to provide the core with a continuous and smooth exterior surface, a continuous thin elastic cover 36 is formed to fit over the body of the core and as the core is expanded, this cover stretches and is drawn more tightly against the surface of the sections providing a smooth continuous surface for engagement with the interior of the tire casing.

In the operation of the device, assuming that the mold is open as shown in Fig. 1 and the core contracted to the position shown in Fig. 1, a green tire is fitted onto the contracted core and pressure is then gradually admitted to the forward end of the cylinder 11 to expand the core to the diameter of the tire casing and mold cavity. To permit assembly of the tire on the core, and expansion of the core without interference with parts of the fixed mold section, the supporting member 10 is mounted for sliding movement in the hub 9, this movement being limited in one direction by the head 14 and in the other by an integral shoulder 37 formed on the member 10, which engages with the rear end of the hub 9. Before applying the tire to the core, the supporting member 10 is moved to its forward position as shown in Fig. 1 so that the core is clear of the fixed mold and after the core has been expanded to the diameter of the mold, the supporting member 10 is moved rearwardly to the position shown in Fig. 2 and the hinged mold section is swung to closed position and hooked by means of a ring 8. After the mold is closed, full pressure is admitted to the forward end of the cylinder 11, causing the core supporting arms 20 to be moved outwardly, compressing the spring 35 and spreading the ends 32 of the stiffening members. This movement of the core supporting members causes enlargement of the core within the mold which results in application of internal pressure to all parts of the tire casing during the vulcanizing operation.

It should be noted that the supporting member 10 floats freely in the hub 9 so that when the core is clamped in the mold, the head 14 can move outwardly as the core supporting members 20 are moved radially into the core so that the core supporting members as they are moved radially will not bind in the mold openings and will remain centered with respect to the core.

While the expansible core is particularly useful in connection with vulcanizing apparatus, the core may be used independently of the vulcanizing apparatus as a tire building core and when so used, the core may be mounted upon a fixed support. As shown in Fig. 4, the core is provided with a supporting member 38, which may be rigidly mounted on a fixed support.

In conclusion, it should be noted that the present invention effects considerable saving in the cost of vulcanizing tire casings, not only by eliminating the use of a large number of relatively short lived air bags, but also by reducing the labor incident to assembling the air bags and casing, inserting the same in the molds, making the necessary connections with the pressure line and stripping the air bags from the casings after the vulcanization; that by means of the collapsible core of the present invention, the charging and discharging of a tire mold may be accomplished in less time than heretofore required; and that the present invention provides an expansible core and mechanism for expanding and contracting the same which is of compact and rugged construction requiring but little modification in the structure of the heater to which it is applied and which may be used for relatively long periods without replacement or repair.

Furthermore, it is to be understood that the particular form of apparatus shown and described and the particular procedure set forth, are presented for purposes of explanation and illustration and that various modifications of said apparatus and procedure can be made without departing from my intention as defined in the appended claims.

What I claim is:

1. In a tire vulcanizing heater having separable mold sections provided with complemental recesses forming an annular mold cavity, a radially and laterally expansible annular core carried by one of said mold sections concentrically with respect to the mold cavity, said core being formed to fit within a tire casing and adapted to be positioned within a tire casing in the mold cavity, a support for said core extending axially thereof and slidably mounted for endwise movement, and means carried by the sliding support for expanding and contracting said core radially and laterally.

2. In a tire vulcanizing heater having separable mold sections provided with complemental recesses forming an annular mold cavity, a radially expansible annular core carried by one of said mold sections concentrically with respect to the mold cavity, said core being formed to fit within a tire casing and adapted to be positioned within a tire casing in the mold cavity, a support for said core extending axially thereof and slidably mounted for endwise movement, a fluid pressure cylinder carried by said sliding support and means interposed between said cylinder and core for expanding and contracting said core.

3. In combination with a watch case heater composed of hinged sections provided with complemental annular recesses forming a mold cavity, a circumferentially and laterally expansible core formed to fit within a tire casing and mounted coaxially with respect to the mold cavity, said core being movable bodily in the direction of its axis, a floating support for said core mounted for axial movement in one of the mold sections, radially movable core supporting members carried by said support, and means actuated by said members for expanding the core laterally.

4. In combination with a watch case heater composed of hinged sections provided with complemental annular recesses forming a mold cavity, a circumferentially and laterally expansible core formed to fit within a tire casing and mounted coaxially with respect to the mold cavity, said core being movable bodily in the direction of its axis, a floating support for said core mounted for axial movement in one of the mold sections, and means including a fluid pressure cylinder carried by said floating support for expanding said core.

5. In a watch case heater composed of hinged sections provided with complemental recesses forming an annular mold cavity, a centrally disposed fluid pressure cylinder mounted for axial sliding movement centrally of one of said sections, a piston rod extending from said cylinder, a head attached to the outer end of said rod, an expansible annular core, and links connecting said core to said head and slidable cylinder.

6. In a watch case heater composed of hinged sections provided with complemental recesses forming an annular mold cavity, a circumferentially and laterally expansible annular core concentric with one of said sections and mounted for movement bodily in an axial direction, means for expanding the core to the diameter of the mold cavity and for contracting the same to a smaller diameter, and means for expanding said core laterally while the same is within the mold cavity.

7. In a watch case heater composed of hinged sections provided with complemental recesses forming an annular mold cavity, a centrally disposed supporting member mounted for axial sliding movement in one of said sections, an auxiliary supporting member mounted for axial movement in said first mentioned supporting member, links pivoted at their inner ends to said supporting members for movement in radial planes, radially projecting arms connected to the outer ends of said links, and an expansible annular core carried by said arms.

8. In a watch case heater composed of hinged sections provided with complemental recesses forming an annular mold cavity, a centrally disposed supporting member mounted for axial sliding movement in one of said sections, an auxiliary supporting member mounted for axial movement in said first mentioned supporting member, links pivoted at their inner ends to said supporting members for movement in radial planes, radially projecting arms connected to the outer ends of said links, said arms having outwardly tapering inner end portions and arcuate telescopically connected laterally expansible core sections yieldably supported on said arms and having inner portions bearing on said tapered portions of said arms.

9. An expansible annular core comprising an axial support, a series of radially extending arms carried by said support, means for moving said arms longitudinally toward and from the axis, and elastically expansible arcuate substantially tubular core sections carried by said arms and telescopically connected end to end, to form an annulus conforming substantially to the interior of a tire casing.

10. An expansible annular core comprising an axial support, a series of radially extending arms carried by said support, means for moving said arms longitudinally toward and from the axis, an annular core composed of telescopically connected arcuate sections formed of resilient sheet metal into which arms extend, said core conforming substantially to the interior of a tire casing, and springs interposed between the outer ends of said arms and said core sections.

11. An expansible annular core comprising an axial support, a series of radially extending arms carried by said support, means for moving said arms longitudinally toward and from the axis, an annular core composed of telescopically connected arcuate sections formed of resilient sheet metal into which arms extend, said core conforming substantially to the interior of a tire casing, flexible stiffening members secured to the inner sides of said sections, and springs interposed between the outer ends of said arms and said core sections.

12. An expansible annular core comprising an axial support, a series of radially extending arms carried by said support, said arms having opposite faces tapering toward the outer ends thereof, an annular core shaped to conform to the interior of a tire casing and composed of hollow arcuate sections telescopically connected end to end and having at the interior of the annulus, edge portions bearing against the tapering faces of the arms, springs interposed between the ends of the arms and said core sections, and means for moving said arms radially to expand and contract said core.

13. An expansible annular core adapted to conform to the interior of a tire casing, comprising a series of arcuate expansible sections formed of sheet metal and telescopically connected end to end, and a one piece elastic cover.

14. An expansible annular core comprising an axial support, a series of radially extending arms carried by said support, means for moving said arms longitudinally toward and from the axis, an annular core composed of telescopically connected arcuate sections formed of resilient sheet metal into which arms extend, said core conforming substantially to the interior of a tire casing, and a thin continuous cover of elastic rubber.

15. An expansible annular core composed of telescopically connected laterally expansible arcuate substantially tubular sections, and means for moving said sections outwardly to increase the diameter of the core and for simultaneously expanding said sections laterally.

16. An expansible annular core composed of telescopically connected laterally expansible arcuate sections of substantially tubular form, radially movable supports for said core having portions engageable with said core sections to expand the same laterally upon outward movement of the supports, and means for simultaneously actuating said supports.

In testimony whereof I affix my signature.

HAROLD A. DENMIRE.